Oct. 1, 1968   W. A. BYRD   3,403,737

DRAWBAR SPACER

Filed June 14, 1965

WYLIE A. BYRD
INVENTOR.

BY
Atty.

3,403,737
DRAWBAR SPACER
Wylie A. Byrd, Rte. 2, Tulia, Tex. 79088
Filed June 14, 1965, Ser. No. 463,817
6 Claims. (Cl. 172—421)

ABSTRACT OF THE DISCLOSURE

On an agricultural implement, notched spacer bars are clamped above and below two or more tool bars. Gage wheels are pivoted to the spacer bars and a screw adjustment extends from the spacer bar to the arm. The pivot and screw are spaced apart widely on the spacer bar.

---

This invention relates to agricultural equipment and more particularly to spaced tool bars.

In recent years agricultural equipment with spaced tool bars has become increasingly popular with the American farmer. In such an implement two or three horizontal tool bars are mounted normal to the direction of draft and in tandem relationship. A framework is thus provided for various plows or sundry other agricultural earth working equipment.

By this invention I provide an improved gage wheel combined with a spacer attachment for multiple drawbars.

An object of this invention is to provide a combination gage wheel attachment and spacer for multiple drawbars.

Further objects are to achieve the above with a device that is sturdy, compact, durable, simple, versatile, and reliable, yet inexpensive and easy to manufacture and operate.

The specific nature of the invention as well as other objects, uses, and advantages thereof will clearly appear from the following description and from the accompanying drawing, the different views of which are not necessarily to the same scale, in which.

Figure 1:
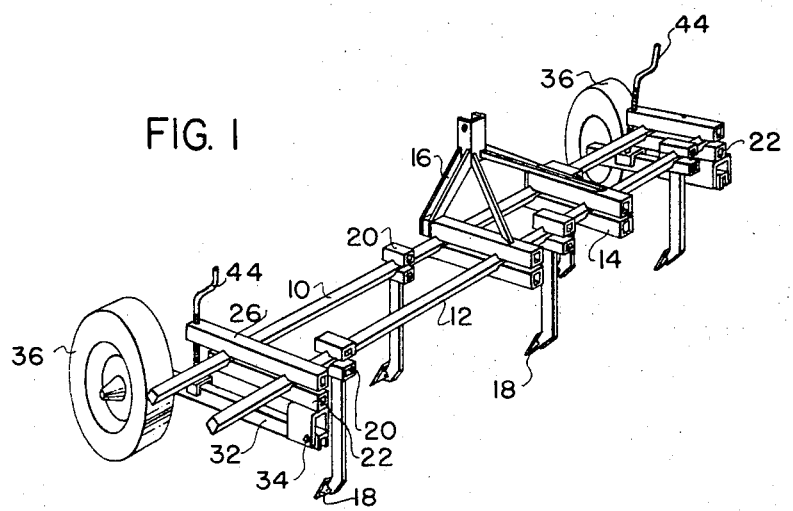
FIG. 1 is a perspective view of a two bar implement according to this invention.
Figure 2:
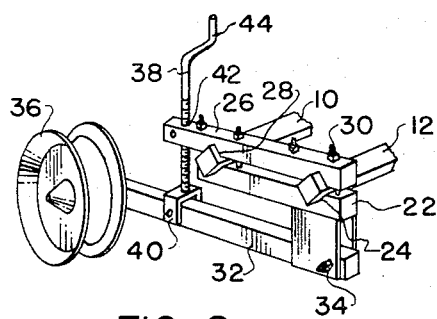
FIG. 2 is an enlarged perspective view of one end of the implement of FIG. 1, the wheel illustrated without a tire.
Figure 3:
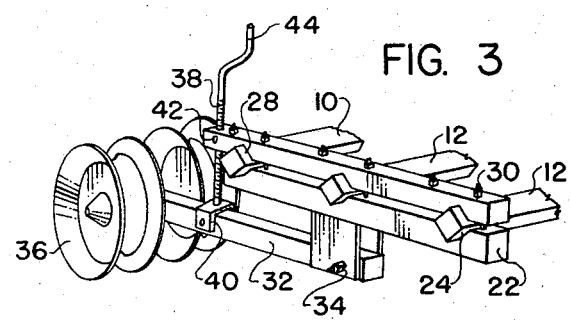
FIG. 3 is an enlarged perspective view of one end of a three bar implement.

Referring more particularly to the drawings, it may be seen that the plurality of parallel tool bars 10 and 12 are mounted horizontally at right angles to the direction of draft and are mounted in tandem (one or more tool bars 12 parallel to and behind the tool bar 10). The tool bars are connected with spacer 14 which is attached to A-frame 16. The tool bars 10 and 12 have earth working implements 18 attached thereto by clamps 20.

Lower spacer bar 22 is located at each end of the tool bars 10 and 12 and is parallel to the direction of draft which is at right angles to the tool bars. The tool bars 10 and 12 fit in notches 24 in the spacer bar 22. Upper spacer bar 26 fits over the tool bars. It likewise has notches 28 into which the tool bars 10 and 12 fit. The two spacer bars 22 and 26 are connected together with a plurality of bolts 30.

Arm 32 is pivoted to the spacer bar 22 by pivot 34. This pivot provides for the pivoting of the arm 32 about an axis which is parallel to the tool bars. Gage wheel 36 is mounted to the end of the arm 32 forward of the forward tool bar 10. It is mounted for rotation to the arm 32 about an axis which is parallel to the tool bars 10 and 12. The gage wheel 36 is vertically positioned by screw 38 which is journalled at its lower end to block 40 on the arm 32. The upper end of the screw 32 passes through nut 42 which is mounted upon spacer bar 26. The upper end of the screw 38 is bent to form a crank 44.

Thus, the attachment forms a dual purpose, i.e. an attachment of the gage wheel to the tool bars as well as a spacer for the tool bars is provided. Furthermore, it may be seen that the gage wheel is very securely attached to all of the tool bars and not to a single one. Were the gage wheel attached to a single tool bar, the torsional strain in the single tool bar is quite large.

Figure 4:
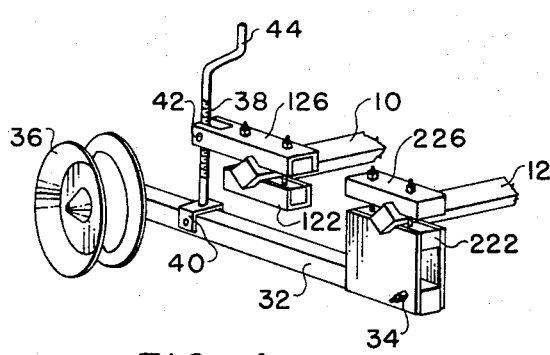
FIG. 4 is an enlarged perspective view of one end of a modified form of implement.

It may be seen that FIG. 4 illustrates a different embodiment. The pivot 34 is attached to the rear tool bar 12 by a clamp having a lower element 222 bolted to upper element 226. The wheel 36 rotates on the end of the arm 32 which is pivoted to the pivot 34 and vertically adjusted by the screw 38 working between the block 40 and the nut 42 as described above. The nut 42 is attached to the forward tool bar 10 by a clamp having upper element 126 and lower element 122. While the clamps do not function as spacers, they do prevent torsional strain which would result if the gage wheel is attached to one tool bar only.

It will be apparent to those skilled in the art that the embodiments shown are only exemplary and that various modifications can be made in construction, materials, and arrangement within the scope of the invention as defined in the appended claims.

I claim as my invention:

1. A combined gage wheel-spacer for a multiple tool bar agricultural implement comprising:
    (a) a spacer bar,
    (b) said spacer bar having multiple notches therein for attaching the spacer bar to multiple tool bars,
    (c) clamp means associated with each notch to clamp the spacer bar to tool bars,
    (d) a pivot attached to the spacer bar,
    (e) said pivot adjacent one of said notches,
    (f) an arm pivoted to the pivot and extending from the pivot,
    (g) a wheel on the end of the arm,
    (h) the axis of rotation of the wheel parallel to the axis of said pivot, and
    (j) vertical adjustment means innerconnecting said arm and spacer bar for adjusting the position of the arm to the spacer bar about the pivot,
    (k) said adjustment means adjacent another of said notches.

2. The invention as defined in claim 1 wherein said adjustment means is in the form of a screw interconnecting said arm and said spacer bar.

3. An agricultural implement comprising:
    (a) at least two parallel tool bars,
    (b) a spacer bar extending at right angles to said tool bars,
    (c) said spacer bar having a notch therein for each tool bar,
    (d) one of said tool bars in each notch,
    (e) each of said tool bars clamped to said spacer bar,
    (f) a plurality of earth working implements clamped to said tool bars,
    (g) an arm pivoted to said spacer bar, adjacent one of said tool bars,
    (h) a gage wheel mounted for rotation to said arm,
    (j) means interconnecting said arm and said spacer bar for adjusting the position between said arm and said spacer bar, adjacent another of said notches.

4. The invention as defined in claim 3 wherein said means for adjustment is in the form of a screw interconnecting said arm and spacer bar.

5. An agricultural implement comprising:
(a) at least two parallel tool bars,
(b) an A-frame connected to said tool bars for supporting same and providing draft for same,
(c) a plurality of earth working implements attached to said tool bars,
(d) a spacer bar at each end of said tool bars,
(e) each spacer bar at right angle to said tool bars,
(f) each spacer bar having a notch therein corresponding to each tool bar with one of said tool bars in each notch,
(g) an upper spacer bar at each spacer bar,
(h) each upper spacer bar having a notch therein at each tool bar,
(j) a plurality of bolts firmly clamping said upper spacer bar to its spacer bar and securely clamping said tool bars therebetween.
(k) an arm pivoted to each lower spacer bar,
(m) said arm pivoted about an axis parallel to said tool bars, adjacent one of said tool bars,
(n) a wheel mounted for rotation on each arm,
(p) said wheel mounted for rotation about an axis which is parallel to said tool bars,
(r) a screw,
(s) the top of said screw forming a crank for rotating same, and
(t) means interconnecting said screw to said upper spacer bar adjacent another of said tool bars and arm for adjusting the position of said gage wheel on the end of said arm to said spacer bar thereby providing an adjustment of said tool bars above the ground when said gage wheels engage the ground.

6. An agricultural implement comprising:
(a) at least two parallel tool bars,
(b) an A-frame connected to said tool bars for supporting same and providing draft for same,
(c) a plurality of earth working implements attached to said bars,
(d) a gage wheel on each end of said tool bars,
(e) an arm to which the gage wheel is mounted for rotation,
(f) clamp means attached to at least two tool bars for pivoting said arm to said tool bars,
(g) a screw interconnecting said clamp means an arm for vertically adjusting said wheels,
(h) said arm pivoted to said clamp means adjacent one of said tool bars, and
(j) said screw adjacent another of said tool bars.

References Cited

UNITED STATES PATENTS 3,057,414   10/1962   Ralston _____ 172—448 X
3,077,231   2/1963    Hamilton _____ 172—421

FOREIGN PATENTS 1,143,057   4/1957   France.
633,784     8/1947   Great Britain.

ABRAHAM G. STONE, *Primary Examiner.*

J. R. OAKS, *Assistant Examiner.*